United States Patent Office 3,347,805
Patented Oct. 17, 1967

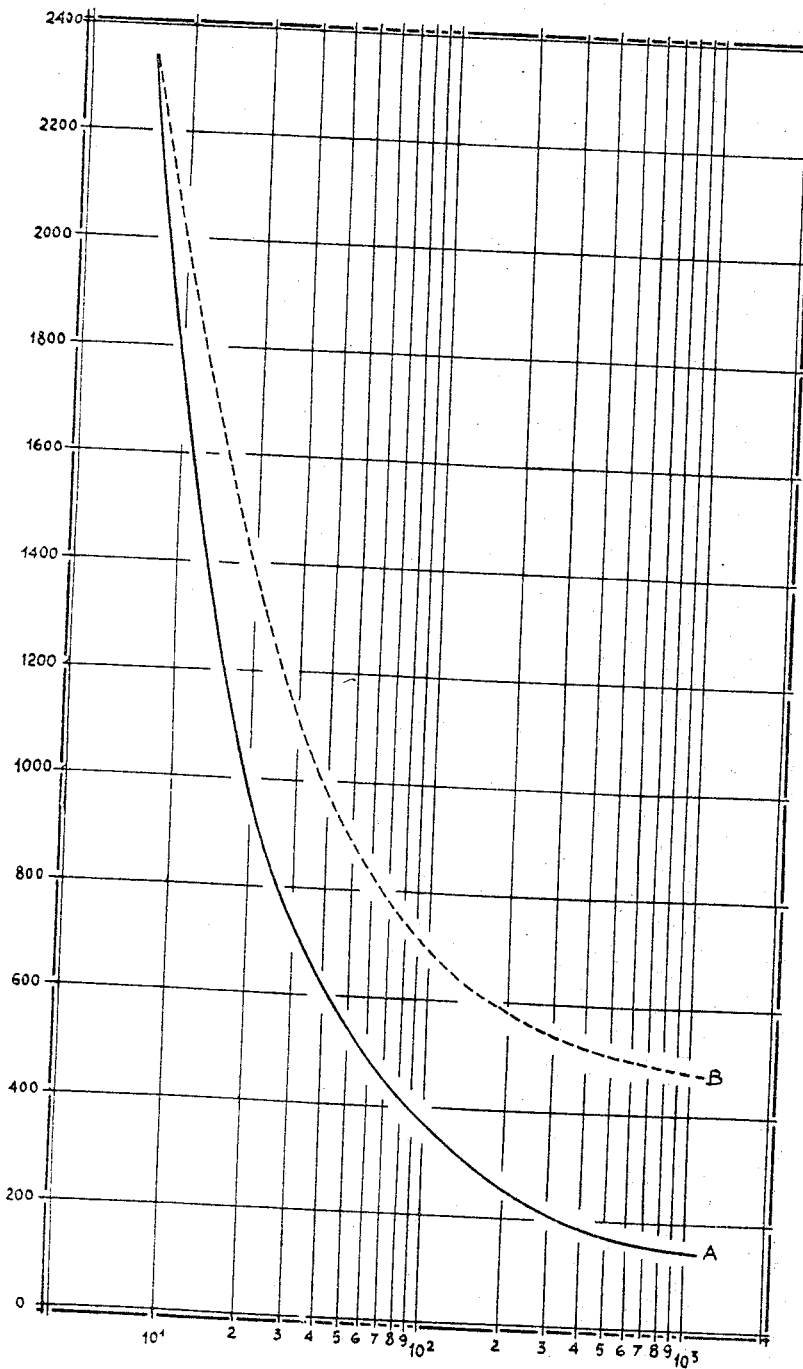

3,347,805
PROCESS FOR PRODUCING SYNTHETIC POLYVINYL ESTER LATICES, PARTICULARLY SUITABLE FOR WATER PAINTS AND LATICES THUS OBTAINED
Massimo Scatena, Mestre, and Mauro Grazia, Milan, Italy, assignors, by mesne assignments, to Montecatini Edison S.p.A., Milan, Italy, a corporation of Italy
Filed Feb. 21, 1963, Ser. No. 260,221
Claims priority, application Italy, Feb. 27, 1962, 3,961/62; Nov. 23, 1962, 29,256/62
5 Claims. (Cl. 260—17)

This invention relates to the production of polymers, obtained in aqueous dispersion, and particularly suitable for use as binding agents in the field of water paints.

The use of aqueous dispersions of water insoluble resins, and in particular of polyvinyl acetate in water paints, is widespread, owing to the many advantages, as e.g. saving and safety in the manipulations, which can be thereby obtained.

A water dispersion of polyvinyl esters, e.g. of polyvinyl acetate, alone or copolymerized with other monomers, must show, among other qualities, the strongest possible binding power for pigments, to thereby obtain paints with very high pigment contents (high pigment/binder ratio, or high "V.C.P.," i.e.: volume concentration of pigment) while maintaining good resistance and duration properties. Moreover, all water dispersions of polyvinyl esters must possess suitable rheological properties, and must also be able to impart like properties to the paints obtained therefrom, so that for instance such paints should have a high viscosity when at rest, in order to prevent a settling of pigment during the storage time, and to avoid any sagging or dripping of paint when applied on vertical supports.

On the other hand, all paints must show a sufficiently low viscosity at the time of their application, in order to make such operation easier and less toilsome; such viscosity changes take place when systems showing a non-Newtonian behavior, as e.g. water dispersions of polymers and the paints obtained therefrom, are differently stressed. By the term "differently stressing" there is to be understood, e.g., the different action exerted by laminar motion on same system. Thus, for instance, a paint in its container may be considered as not stressed, i.e. in its rest condition, since the paint is subject to gravitational forces only; on the other hand, the paint film which, while being applied, lies between the brush and the support is highly stressed, since in this latter case it is acted upon by unusually strong laminar motions. Such rheological behavior of water dispersions of vinyl esters and of paints obtained therefrom must be influenced properly, in order to prevent those ill effects which are, in the rest conditions, those already mentioned (storage stability of the system) or in the case of high stressing, the difficult manner of spreading when for example the viscosity is high at the time of brushing. Thus for instance, the possibility exists of increasing the viscosity, both of vinyl ester dispersions and of paints obtained therefrom, by increasing the protective colloid contents, to thereby maintain a very high viscosity in the condition of rest, thus preventing the settling phenomena; however, by this expedient the application properties are greatly impaired, since a high viscosity is maintained even while the paints are being brushed onto the supports, which results in a hard and laborious brushwork.

As is well known, an increase of the viscosity in the stationary condition can be obtained by increasing the solids contents of paint, and in such a case a subsequent dilution results in a decrease of viscosity, and thus also in a good workability. However, under such conditions, when the action of laminar motion is discontinued, i.e. when the paint is no longer highly stressed by the brush and is allowed to return to its rest condition, the viscosity value is obviously insufficient to prevent the paint from sagging and tearing along its support.

The main object of this invention is therefore the provision of water dispersions of polyvinyl esters, such as polyvinyl acetate, exhibiting a high binding power toward pigments and capable as imparting, at the same time, suitable rheological properties to the paints obtained therefrom so that the viscosimetric behavior thereof be sufficiently high, in the rest condition, to prevent the sagging and tearing phenomena, while being sufficiently low under stressing.

According to this invention, the vinyl esters (and in particular the vinyl acetate, alone, or mixed with other monomers) are polymerized in water dispersion, in the presence of a protective colloid, and of an emulsifying agent selected amongest the following ones:

(a) A compound having the general formula:

$$CH_3-(CH_2)_m-CH_2-(OCH_2-CH_2)_n-OSO_3Me \quad (I)$$

in which $m$ ranges from 4 to 20, $n$ is in the range from 10 to 30, and Me is an alkaline metal or ammonium ion.

(b) A mixture consisting of:

(1) 50 to 90 parts of a compound (A) having the general formula:

$$R(OCH_2CH_2)_nOCH_2CH_2OH$$

(2) 50 to 10 parts of a compound (B) having the general formula:

$$R_1OSO_3Me$$

in which R and $R_1$ may be alike or different from one another and represent saturated or unsaturated hydrocarbon radicals, with a number of carbon atoms ranging from 4 to 30; $n$ is a whole number ranging from 10 to 30, and Me is an alkaline metal or ammonium ion.

Many and important advantages are offered by the mixtures listed under point (b), e.g. the ready availability of the mixture components, and the improved general properties of the paints obtained by the use of aqueous dispersions obtained with the above-stated mixed emulsifying agents. The improvement in the general properties is particularly true with regard to abrasion resistance and to washing stability of paints. The above advantages are attained without prejudicing either those binding properties of polymer dispersion or those rheological properties, both of the dispersion and of paints derived therefrom, that can be attained by the use of emulsifying agents covered by the general formula I.

Obviously, in place of the mixture (b), the product obtained by the sulfonation and subsequently neutralization of a mixture consisting of 50 to 90 parts of a compound with the general formula:

$$R(OCH_2)_nOCH_2CH_2OH$$

and 50 to 10 parts of a compound having the general formula:

$$R_1OH$$

wherein R, $R_1$ and $n$ have the same meaning as stated above, may be used, with equally good results.

As a protective colloid, use may be made, e.g. of polyvinyl alcohol; however, the substances of cellulosic nature, and in particular hydroxyethylcellulose, have proved to be highly advantageous, above all from the viewpoint of a better binding power.

The amounts of protective colloid and of emulsifying agents according to the invention are preferably in a range of 0.1 to 0.5% by weight, and 0.1 to 5.0% by weight, respectively, based on the total weight of the dispersion.

The scope and the objects of this invention will be better and more completely understood from a consid-

3 eration of the following examples, which are to be understood as nonrestrictive embodiments of the invention.

Example No. 1

An emulsion polymerization was carried out in a four-necked, round-bottomed, 2-liter flask, fitted with reflux condenser, stirrer, thermometer and separating funnel for the addition of additives, using the following components:

|  | Parts by wt. |
|---|---|
| Vinyl acetate monomer | 400 |
| Butyl acrylate monomer | 135 |
| Hydroxyethylcellulose (Cellosize Wp09) | 6.5 |
| Emulsifying agent of the type (I), wherein: | |
| $m=10$, $n=15$, and Me=Na | 20 |
| Potassium persulfate | 2 |
| Trisodium phosphate | 1.3 |
| Water | 430 |

In the practical operation, at the beginning water, hydroxyethylcellulose, emulsifying agent, trisodium phosphate, 10% of the amounts of butyl acrylate and vinyl acetate, and finally potassium persulphate were put into the flask. Then the flask was heated, and when a temperature of 70° C. was attained in the bath, the feeding of the remaining amount of monomers was started. The addition of the monomers was completed within two hours. The bath temperature increased up to a maximum, whereafter a slow decrease in the temperature was observed. At that time, the end point of polymerization was considered as attained, and therefore the flask contents were suitably cooled.

The binding power of the dispersion obtained according to Example 1 was then determined.

To the above purpose, a paste of conveniently selected pigments—e.g. titanium dioxide, lithopone inorganic fillers—was made up in a suitable mixer; then, variable amounts of a dispersion, prepared in such a manner as to obtain paints having different C.V.P. (concentration by volume of pigment), were added to said paste, after a suitable homogenization thereof.

The ultimate tensile stress was then determined on films of suitable sizes, obtained from the above paints.

As already known such ultimate tensile stress, or stress of rupture, when plotted as a function of C.V.P., will show a maximum that corresponds to a given C.V.P., and that is called CCVP (critical concentration by volume of pigment); the binding power of dispersion is numerically expressed by such value; the higher such value, the better the binding power of dispersion. In the case in question, a CCVP value of 55 was found.

The rheological properties of the dispersion obtained according to Example 1 can be better outlined by plotting the viscosity curve VS against the flow fall in a suitable graph; for this purpose, recourse must be had to a special viscosimeter that allows the viscosity to be determined as a function of the flow fall, variable within a given range. Such determinations were made on "Rotovisco" Viscosimeter, with the MV$_1$ spindle, at 20° C. [A. Rodeyns, IV FATIPEC Congress 1957, Congress-book, page 267 (Lucerne)]. The characteristic curve of the dispersion that was investigated in the case in question is shown in the graph (curve A) of the accompanying drawing, where the viscosity (c.p.s.) is plotted on the ordinate, while the flow fall is plotted on the abscissa (sec.$^{-1}$). As can be observed, high viscosities correspond to low flow falls, with values very near to the stationary condition, while with high flow falls low viscosities are obtained with values that may be compared with those which are observed during the application (e.g. by means of a brush) of the dispersion in the form of a paint.

Substantially equal results have been also obtained by using in another test ammonium instead of sodium as a component of the emulsifying agent.

Example No. 2

The polymerization of the following mixture was carried out by employing the same experimental technique as outlined in Example 1.

|  | Parts by wt. |
|---|---|
| Vinyl acetate monomer | 400 |
| Butyl acrylate monomer | 135 |
| Polyvinyl alcohol (hydrolysis deg. 87.5%) | 6.5 |
| Emulsifying agent of the type (I), wherein: | |
| $m=10$, $n=15$ and Me=Na | 20 |
| Potassium persulfate | 2 |
| Trisodium phosphate | 1.3 |
| Water | 430 |

The CCVP was determined under the same experimental conditions as stated for the evaluation of dispersion obtained according to Example 1. A CCVP value of 50 was found in this second case.

A change in the amount of protective colloid, while leaving all other components unchanged, did therefore result in a decrease of binding power of dispersion, though the viscosimetric behavior thereof was maintained on a very good level.

Substantially equal results have been also obtained by using in another test ammonium instead of sodium as a component of the emulsifying agent.

Example No. 3

The polymerization of the following mixture was carried out, for comparison purposes, by adapting the same experimental technique as outlined in Example 1.

|  | Parts by wt. |
|---|---|
| Vinyl acetate monomer | 430 |
| Butyl acrylate monomer | 135 |
| Hydroxyethylcellulose (Cellosize Wp09) | 6.05 |
| Nonionic emulsifying agent (a condensation product of ethylene oxide=Nonylphenylpolyoxyethylene M.W. 1000) | 20 |
| Potassium persulfate | 2 |
| Trisodium phosphate | 1.3 |
| Water | 430 |

In this latter case, the viscosimetric (rheologic) behavior of the dispersion was tested, to compare it with that of the dispersion obtained according to Example 1. It has been thus possible to draw the curve B of the graph.

From a comparison of curves B and A it can be noted that, whereas under mild stressing conditions (very near to rest condition) the viscosities are nearly similar (and thus a similar behavior can be assumed), when severe conditions (similar to conditions that are encountered while the paints obtained from such dispersions are being applied) insufficiently low values are attained whereby the working becomes more difficult.

Example No. 4

An emulsion polymerization was carried out with the following components, in a 2-liter, three-necked, round-bottomed flask, fitted with reflux condenser, stirrer, thermometer and separating funnel for the addition of the additives.

|  | Parts by wt. |
|---|---|
| Vinyl acetate monomer | 400 |
| Butyl acrylate monomer | 135 |
| Hydroxyethylcellulose (Natrosol 250L) | 6.5 |
| Emulsifying-agent mixture, consisting of: | |
| 60 parts of emulsifying agent A | 20 |
| 40 parts of emulsifying agent B | 20 |
| (where R and R$_1$ are normal decylic radicals, Me=Na and $n=15$) | |
| Ammonium persulfate | 1.7 |
| Sodium bicarbonate (NaHCO$_3$) | 1.5 |
| Water | 430 |

In the practical operation, water, hydroxyethylcellulose, the emulsifying agent, sodium bicarbonate, 10% of the whole amounts of butyl acrylate and vinyl acetate, and finally the ammonium persulfate were firstly put into the flask, which was then heated until the bath attained a temperature of 70° C., at which time the feeding of the remaining monomer amounts was started. The addition of monomers was completed within two hours. The bath temperature increased up to a maximum, whereafter a slow decrease in the temperature was observed. At that time, the polymerization end point was considered as attained, and therefore the flask contents were suitably cooled.

The binding power of the dispersion thus obtained was then determined. By following the same evaluation technique as used for the classification of the dispersion obtained according to Example 1, a value of 58 was found. The peculiar variation manifested by the curve A of the accompanying graph was shown also by the rheological properties of this dispersion.

The dispersion showed also washability properties (after having been converted into a water paint) better than those of the dispersion obtained according to Example 1. The use of emulsifying-agent mixtures, while maintaining unchanged the binding power and rheological properties of the dispersion thus obtained, did also improve the general behavior thereof from the viewpoint of other features, which are not less important than the above-stated ones.

Substantially equal results have been also obtained by using in another test ammonium instead of sodium as a component of the emulsifying agent.

Very good results have been obtained also in tests where other emulsifying agents selected among those indicated under (a) and (b) have been used.

*Example No. 5*

An emulsion polymerization was carried out with the following components, in a 2-liter, four-necked, round-bottomed flask, fitted with a reflux condenser, stirrer, thermometer and separating funnel for the addition of additives.

| | Parts by wt. |
|---|---|
| Vinyl acetate monomer | 400 |
| Butyl acrylate monomer | 135 |
| Hydroxyethylcellulose, Natrosol 250L | 6.5 |
| Emulsifying-agent mixture, consisting of: | |
| 60 parts of emulsifying agent A and | |
| 40 parts of emulsifying agent B | |
| (where R and $R_1$ are normal octylic radicals, Me=Na and $n$=10 units) | |
| Ammonium persulfate | 1.7 |
| Sodium bicarbonate ($NaHCO_3$) | 1.5 |
| Water | 430 |

The same experimental procedure as outlined in Example 4 was followed.

The rheological properties were evaluated on the end product; the curve of viscosity as a function of the flow fall was wholly similar to that shown by the curve A.

The abrasion-resistance and washability tests, and the binding-power measurements, also gave results wholly similar to those obtained for the dispersion according to Example 4.

Substantially equal results have been also obtained by using in another test ammonium instead of sodium as a component of the emulsifying agent.

Very good results have been obtained also in tests where other emulsifying agents selected among those indicated under (a) and (b) have been used.

As can be readily appreciated from the above Examples, by selecting suitable protective colloids, superior binding properties can be obtained, while the selection of proper emulsifying agents is essential for obtaining those viscosimetric (rheologic) properties which are required for the correct use of water dispersions of vinyl esters, such as as the mono- and copolymer vinyl acetate.

What is claimed is:

1. A process for producing polyvinyl-ester synthetic latexes, suitable for water thinnable paints, which comprises polymerizing vinyl esters, in an aqueous dispersion, in the presence of a protective colloid, and of an emulsifying agent of a composition selected from the group consisting of compositions (a), (b) and (c) wherein said composition (a) is a compound having the general formula:

$$CH_3-(CH_2)_m-CH_2(OCH_2-CH_2)_nOSO_3Me$$

in which $m$ ranges from 4 to 20, $n$ is a whole number in the range from 10 to 30 and Me is an alkaline metal, or ammonium ion; composition (b) is a mixture consisting of 50 to 90 parts by weight of a compound having the general formula:

$$R(OCH_2CH_2)_nOCH_2CH_2OH$$

and 50 to 10 parts by weight of a compound having the general formula:

$$R_1OSO_3Me$$

in which R and $R_1$ may be identical or different from one another, and represent saturated or unsaturated hydrocarbon radicals with a carbon number ranging from 4 to 30, $n$ is a whole number ranging from 10 to 30, and Me is an alkaline metal or ammonium ion; and composition (c) is the product obtained by the sulfonation and subsequent neutralization of a mixture consisting of 50 to 90 parts by weight of a compound having the general formula:

$$R(OCH_2CH_2)_nOCH_2CH_2OH$$

and 50 to 10 parts by weight of a compound having the general formula:

$$R_1OH$$

wherein R, $R_1$ and $n$ have the same meanings as stated above.

2. A process according to claim 1, wherein the vinyl ester is vinyl acetate.

3. A process according to claim 1, wherein the protective colloid is used in amounts ranging from 0.1 to 1.5% by weight, while the emulsifying agent is used in amounts in the range from 0.1 to 5% by weight, based on the total weight of the dispersion.

4. A process according to claim 1, wherein the protective colloid is selected from the group consisting of polyvinyl alcohol and a cellulose derivative.

5. A process according to claim 1, wherein the protective colloid is hydroxyethylcellulose.

References Cited

UNITED STATES PATENTS

| 1,970,578 | 8/1931 | Schoeller et al. | 252—253 |
| 3,150,110 | 9/1964 | Becker et al. | 260—17 |
| 3,154,510 | 10/1964 | Bryan et al. | 260—17 |

OTHER REFERENCES

Schwartz et al.: "Surface Active Agents and Detergents," vol. II, pages 676–677, Published 1958.

SAMUEL H. BLECH, *Primary Examiner.*

WILLIAM H. SHORT, *Examiner.*

J. NORRIS, *Assistant Examiner.*